Figure 1:
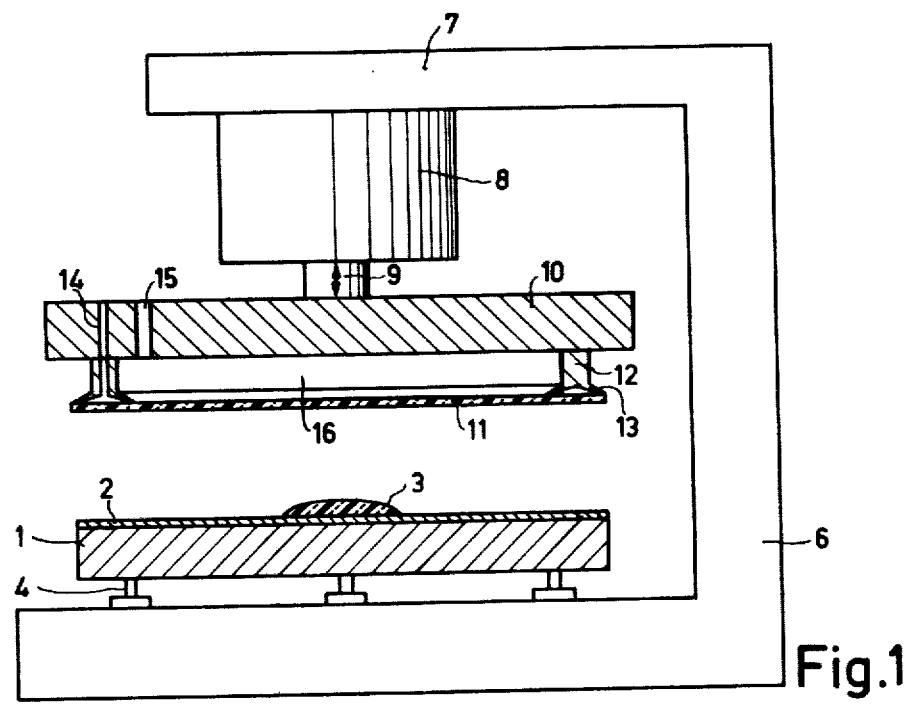

United States Patent [19]

Kraakman et al.

[11] 4,312,823
[45] Jan. 26, 1982

[54] METHOD OF MANUFACTURING A PLASTIC RECORD CARRIER HAVING A STRATIFIED STRUCTURE

[75] Inventors: Hillebrand J. J. Kraakman; Egbert Broeksema; Sjoerd Nijboer, all of Eindhoven, Netherlands

[73] Assignee: U.S. Philips Corporation, New York, N.Y.

[21] Appl. No.: 124,878

[22] Filed: Feb. 26, 1980

Related U.S. Application Data

[60] Continuation of Ser. No. 949,918, Oct. 10, 1978, abandoned, which is a division of Ser. No. 798,323, May 19, 1977, abandoned.

[30] Foreign Application Priority Data

Mar. 14, 1977 [NL] Netherlands ............... 7702702

[51] Int. Cl.³ .................. B29D 17/00; B29C 3/00; B30B 3/00; B30B 9/28
[52] U.S. Cl. .................. 264/107; 425/127; 425/128; 425/174.2; 425/174.4; 425/389; 425/437; 425/405 R; 425/810
[58] Field of Search ........... 425/110, 387, 388, 405 R, 425/DIG. 60, 405 H, DIG. 48; 264/89, 93, 107

[56] References Cited

U.S. PATENT DOCUMENTS

| | | | |
|---|---|---|---|
| 1,209,308 | 12/1916 | Lanhoffer | 425/405 H |
| 1,260,002 | 3/1918 | Lanhoffer | 425/405 H |
| 2,441,097 | 5/1948 | Hicks | 425/388 |
| 2,565,949 | 8/1951 | Clifford et al. | 425/389 X |
| 2,962,757 | 12/1960 | Slemmons et al. | 425/288 X |
| 2,968,064 | 6/1961 | Howell | 425/388 |
| 2,991,600 | 7/1961 | Lancaster | 425/DIG. 48 |
| 3,112,570 | 12/1963 | George et al. | 425/389 X |
| 3,594,877 | 7/1971 | Sudga et al. | 425/405 H |
| 3,614,811 | 10/1971 | Johnson | 425/DIG. 19 |
| 3,894,179 | 7/1975 | Jacobs et al. | |

FOREIGN PATENT DOCUMENTS

| | | | |
|---|---|---|---|
| 1094996 | 12/1960 | Fed. Rep. of Germany | 425/389 |
| 7212045 | 3/1974 | Netherlands | 425/110 |
| 7411707 | 4/1975 | Netherlands | 425/110 |

Primary Examiner—J. Howard Flint, Jr.
Attorney, Agent, or Firm—Thomas A. Briody; William J. Streeter; Algy Tamoshunas

[57] ABSTRACT

The invention relates to a method of manufacturing a plastic record carrier, in particular a video disc, in which a mold is provided with a fluid molding resin. A substrate is then deformed into a convex shape and pressed against the resin disposed on the center of the mold. The molding resin is rolled over the surface of the mold with a circular fluid front while the shape of the substrate is simultaneously changed from convex to planar form. After the molding resin has been spread over the entire mold and the planar substrate bears against the resin layer, the molding resin is then cured. The substrate is preferably deformed by flexibly supporting a planar substrate about its edge and then applying a different gas pressure on both sides of the substrate. The molding resin is preferably radiation-curable and is cured by exposure to, for example, ultra-violet light through the substrate.

9 Claims, 11 Drawing Figures

METHOD OF MANUFACTURING A PLASTIC RECORD CARRIER HAVING A STRATIFIED STRUCTURE

This is a continuation of application Ser. No. 949,918, filed Oct. 10, 1978, which is a division of application Ser. No. 798,323, filed May 19, 1977, both of which have now been abandoned.

The invention relates to a method of manufacturing a plastic record carrier having a stratified structure in which a fluid molding resin is provided on a mold surface having an information track, a flexible substrate is provided on the layer of molding resin, the layer of resin is cured and the assembly of substrate and attached layer of cured resin is removed from the mold.

Such a method is described in Netherlands Patent Application No. 7,411,707 laid open to public inspection Apr. 17, 1975 and corresponding to British Patent No. 1,493,114, published Nov. 23, 1977, is described in detail therein with reference to FIG. 5B. According to this known method the whole surface of the mold is provided with the liquid moulding resin and subsequently the substrate is provided over the layer of molding resin by means of a cylindrical roller. Of course, the thickness of the layer of molding resin is influenced and adjusted by the pressure with which the cylindrically curved substrate is pressed on the molding resin. The method is less suitable for use in a larger scale production process. In addition the method has the principal drawback that, by using a cylindrical pressure roller, the layer of resin deformed in this manner, shows differences in thickness in direction at right angles to and parallel to the cylinder axis of the pressure roller.

The information track present in the mold and impressed in the resin is as a rule in the form of a spiral or otherwise consists of concentric circles. Said information track is scanned rotationally symmetrically in which speeds of rotation of the record carrier in the order of 1500 rpm are realized. This relates to record carriers containing very refined video information, the so-called video discs.

Applicants have discovered that the above described application of the layer of resin by means of a cylindrical roller results in two inevitable errors which occur every revolution during scanning of the finished product. At the above mentioned rotation speed this leads to 3000 disturbances per minute, which means an interference signal of 50 Hz.

On the basis thereof Applicants have further discovered a fact, on which the present invention is also based, that the layer of resin with its information track has to be built up in the same manner as it is scanned and read afterwards in the reproduction apparatus, that is a rotationally symmetrical build-up.

The invention thus relates to a method of the kind mentioned in the preamble and is characterized in that the flexible substrate is vaulted spherosymmetrically, that is, deformed into a convex shape bulging toward the mold, and pressed against a relatively thick volume of the molding resin which is provided centrally on the mold, the molding resin thereby being rolled out over the mould surface with a circular fluid front and the vaulted substrate thereby being deformed to finally form a relatively thin plane surface, the molding resin being cured and the assembly of substrate with attached layer of cured resin being removed from the mold.

In a favorable embodiment of this method, when the circular fluid front of the molding resin has nearly reached the edge of the mold, the substrate which has not yet been deformed entirely to form a plane surface, is uncoupled from the pressure force so that the substrate is relieved. The substrate thereby pushes the fluid front towards the edge of the mold and engages the layer of resin without stress.

It will be obvious that a substrate which engages the layer of resin without stress will provide, after curing of the layer of resin, a record carrier having no or only small internal stresses, as a result of which the possibility of deformation and possibly modulation of the stored information associated therewith is minimized.

The resulting plastic record carrier, after separation from the mold, also has the smoothness of the mold. Starting from a substrate which is not entirely plane, an entirely plane plastic record carrier can be obtained, provided the mold is plane.

In a further favorable embodiment of the method according to the invention, the convex, spherosymmetrically vaulted substrate is pressed against the molding resin which has been deposited centrally on the mold in the form of a ring. According to this preferred embodiment of the method, record carriers, for example video discs, can be manufactured in which no layer of resin is present in the central portion. Said portion may be used, for example, for providing a label.

In a further elaboration of the last-mentioned preferred embodiment, a spherosymmetrical substrate is used which has a central aperture, the diameter of the aperture corresponding to or being smaller than the inside diameter of the annular layer of resin deposited on the mold. The aperture present in the resulting record carrier may serve to center the record carrier around a centering pin present in the reproduction apparatus.

In the method of the invention, it is preferable to realize the convex shape of the substrate by flexibly suspending or supporting a plane substrate, which is in the form of a circle or ring, along its whole circumference and then providing a gas pressure which is different on both sides of the substrate.

According to a further favorable embodiment of the method according to the invention the difference in gas pressure is variable and also forms the force with which the spherosymmetrically vaulted substrate is pressed against the molding resin.

In the method according to the invention the conventionally used polymerizable molding resins, for example the thermosetting urethane resin provided with a catalyst as stated in the above-mentioned Netherlands Patent Application No. 7,411,707, may be used. A radiation-curable moulding resin is preferably used which is exposed via the substrate after having been rolled out completely over the mold.

Very suitable, radiation-curable molding resins are those which are described in U.S. application Ser. No. 774,973, filed Mar. 7, 1977, now abandoned in favor of U.S. application Ser. No. 887,188, filed Mar. 16, 1978, commonly assigned. Such readily usable molding resins comprise low-molecular monomers and/or oligomers which contain on an average 25–70% by weight of saturated hydrocarbon groups and/or phenyl groups, are furthermore aprotic and have an average functionality as regards unsaturation which lies between the values 2 and 6.

Thin-liquid mixtures of low-molecular mono-, di-, tri- or tetra ester of acrylic acid are preferably used to which a photosensitive catalyst, for example an aromatic carbonyl compound, for example benzoin-isobutyl ether, has been added.

Examples of acrylic acid esters are 2-ethylhexylacrilate, ethylacrylate, phenylacrylate, 2-ethoxyethylacrylate and octadecylacrylate.

The mold used in the method according to the invention is preferably a mold of which at least the surface comprising the information track is manufactured from metal.

A very suitable mold is a mould manufactured from nickel as described, for example, in U.S. Pat. No. 3,894,179 in the name of Applicants. The mold preferably has on its side remote from the information track a plane stiffening plate, for example, an aluminium plate having a thickness of 1 to 10 mm.

The above-described, radiation-curable molding resin does not adhere to the metal mold after curing but can readily be detached from the mold. A separate detaching agent is not necessary and is not desired either because the transfer of information from the mold to the molding resin should be as accurate as possible.

As a substrate a plastic plate is used having a thickness between 100 μm and 1.5 mm. When radiation-curable molding resins are used, the substrate should be previous to the radiation used, for example ultra-violet light. Suitable plastics are, for example, polyvinylchloride, copolymeric vinylchloride vinyl acetate, polycarbonate polyester, polymethylmethacrylate and polystyrene. The above mentioned molding resins readily adhere to the said substrates. If desired the adhesion may be improved by chemically roughening the substrate with, for example, chloroform or providing it with an adhesion-improving top layer. For example, plexiglass may be provided with a top layer of polyvinylchloride-/acetate.

The invention also relates to a device for carrying out the method according to the invention which comprises a holder for the flexible substrate, which holder has a connection possibility for a pump, a support plate for the mold, as well as a source of power to move the holder or part of the holder relative to the support plate.

Such a device is known in itself from German Patent Specification No. 1,094,996, wherein a press for gramophone records is disclosed in which at least one of the two press molds is provided with a flexible diaphragm, the edge portion of which is clamped between the press mold and a pressure ring connected to the mold(s) by a screw joint. The press mold has a pressure line through which liquid is pressed between the press mold and the diaphragm and consequently the diaphragm is deformed to become convex. This known device is not suitable for carrying out the method according to the invention and has inter alia the drawback that the diaphragm cannot easily be removed from the press mold. In this case it is to be noted that in the method according to the present invention the flexible substrate has to be removed from the mold together with the cured layer of molding resin. The substrate forms part of the record carrier so that a separate flexible substrate is needed for each plastic record carrier to be produced. In the device known from German Patent Specification No. 1,094,996 the diaphragm which does not form part of the record disc to be produced is permanently connected to the press mold and serves to expel the air present between the press mold and the disc to be pressed.

The invention provides a device of the above-mentioned kind which is particularly suitable for carrying out the method according to the invention and is characterized in that the holder comprises an elastically deformable cylindrical collar which at its annular end face remote from the holder comprises means to connect the substrate to the said collar along the circumference in a detachable and air-tight manner.

In the preferred embodiment of the device according to the invention the end face of the collar comprises one or more vacuum grooves in which a sub-atmospheric pressure can be generated so that the substrate is drawn against the collar.

In this preferred embodiment of the device the substrate can be uncoupled from the holder in a very simple manner, namely by removing the sub-atmospheric pressure in the vacuum grooves.

In a further favorable embodiment of the device the cylindrical collar is closed by a flexible diaphragm on the side of the end face.

Said flexible diaphragm constitutes an extra support over the entire surface of a substrate held by vacuum pressure on the end face on the collar. This is of particular importance if a substrate having a central aperture is used in the device according to the invention. In a particularly suitable embodiment of the device according to the invention which is meant especially for handling substrates having a central aperture, the above-mentioned diaphragm comprises a central recessed portion and furthermore the mold comprises a central boss, the boss fitting in the recessed portion of the diaphragm.

According to another favorable embodiment of the device according to the invention the support plate with mold is situated entirely within the holder of the substrate, by placing the substrate in the holder an entirely closed system is obtained in which notably the molding resin provided on the mold is completely protected from ambient influences.

More particularly, in this favorable embodiment the collar at its end remote from the substrate comprises a projecting elastically deformable annular flange which at its free end is connected to a cylindrical jacket which at its end remote from the flange is closed by a bottom portion, the support plate with mold extends from the bottom portion into the space bounded by jacket, flange and collar, the mold being parallel to the substrate and the device comprising a connection possibility for connecting a vacuum pump, in which, by providing sub-atmospheric pressure in the space, the substrate is deformed so as to be spherosymmetrical and pressed against the mold under elastic deformation of collar and flange.

Figure 2:
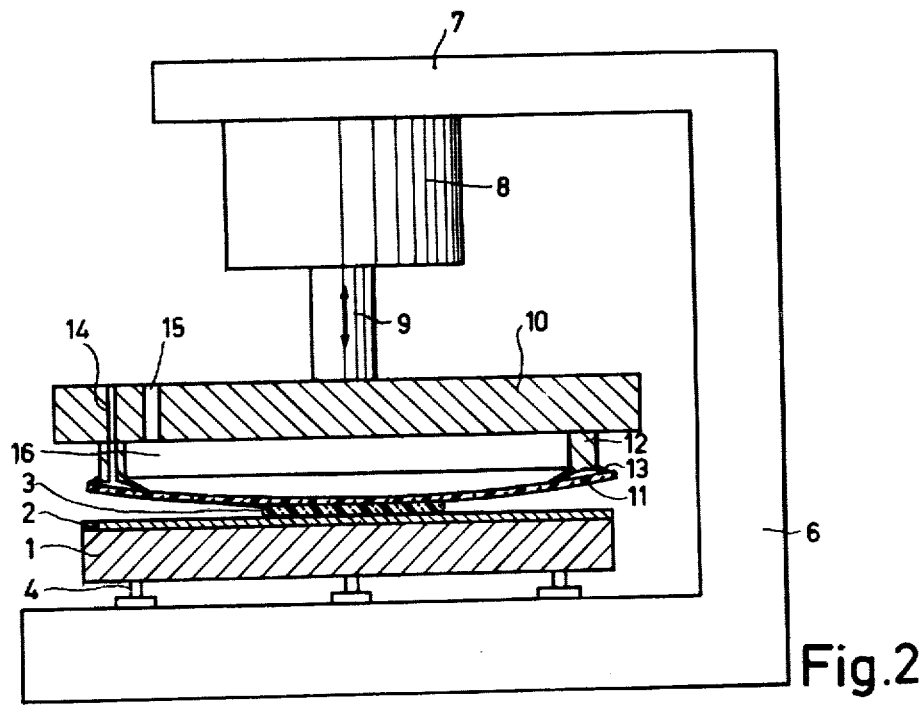
Figure 3:
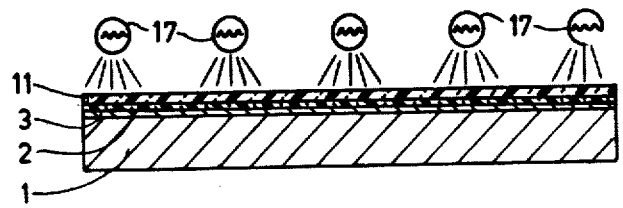
Figure 4:
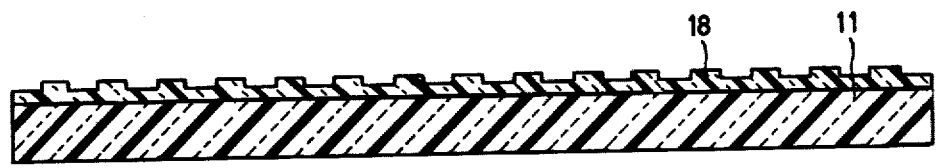
Figure 7:
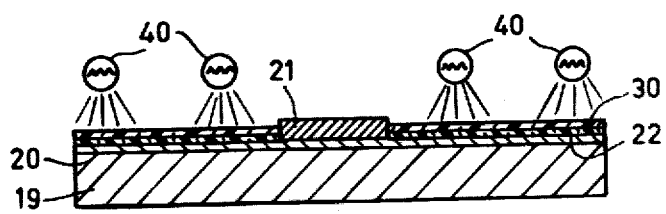
Figure 8:
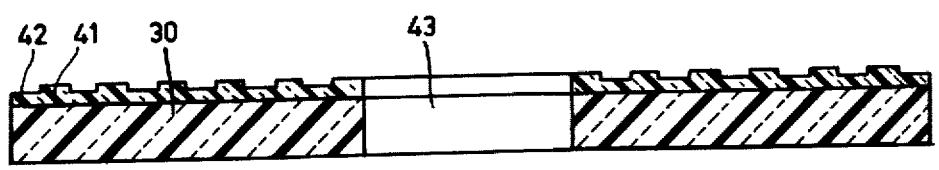
Figure 5:
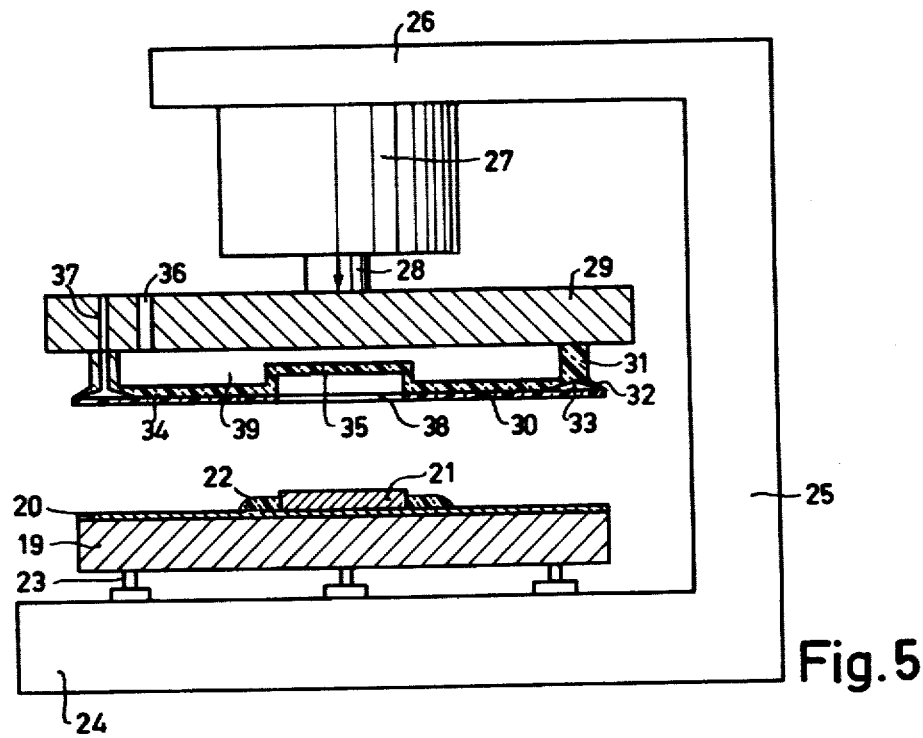
Figure 6:
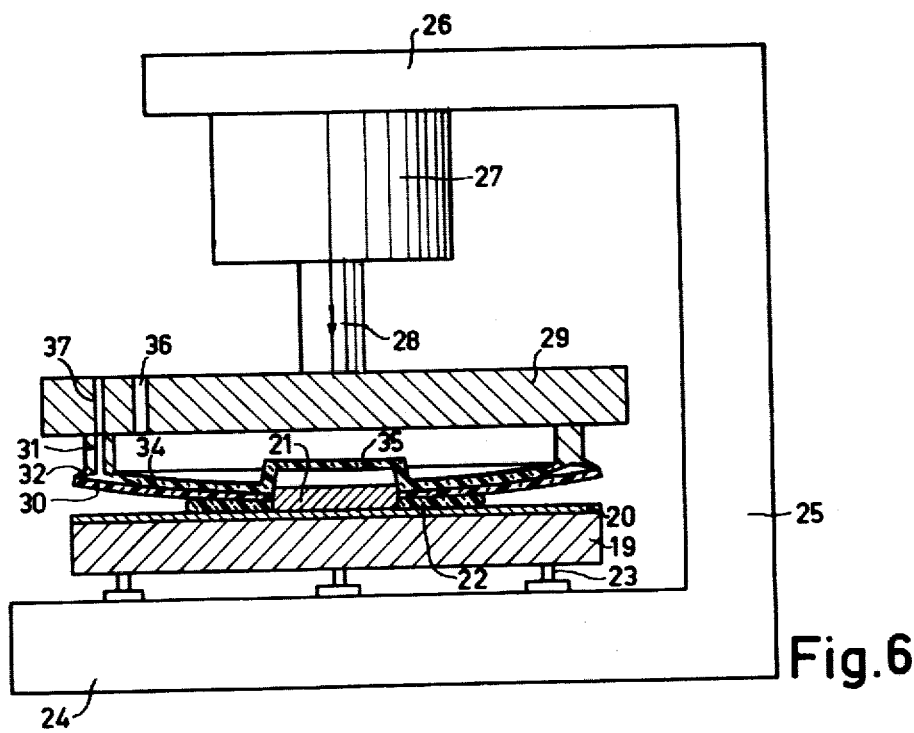
Figure 9:
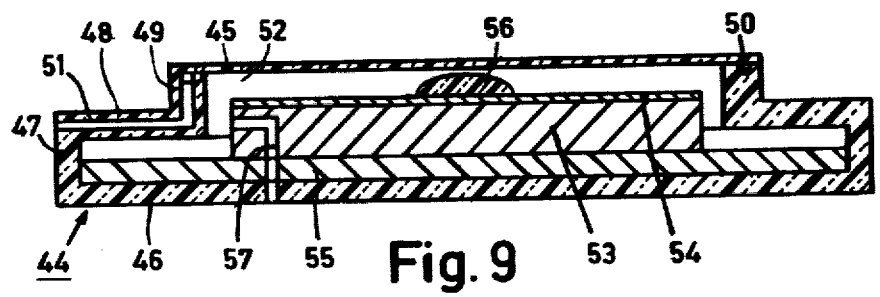
Figure 10:
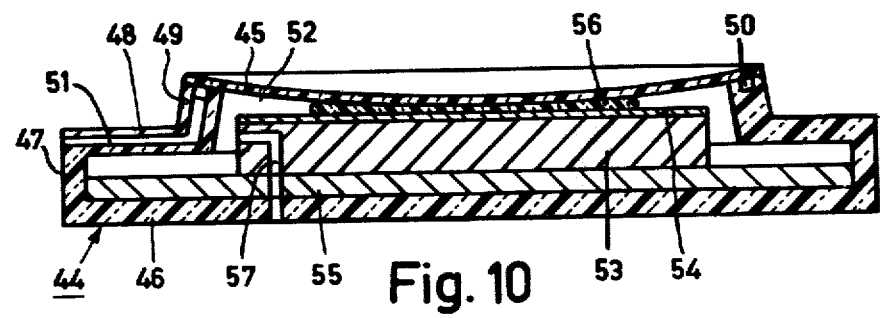
Figure 11:
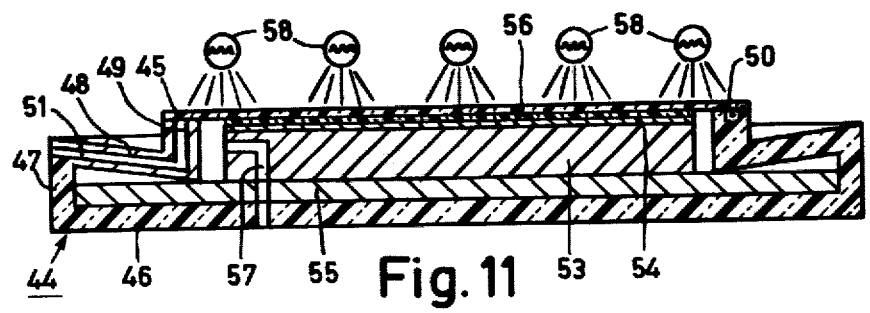

The invention will be described in greater detail with reference to the drawing, in which FIGS. 1-3 are cross-sectional views of a device or a part of the device for carrying out several stages of the method according to the invention, FIGS. 4 and 8 are cross-sectional views of a plastic record carrier manufactured by means of the method according to the invention, FIGS. 5-7 are cross-sectional views of another embodiment of the device for carrying out various stages of the method according to the invention, FIGS. 9-11 are cross-sectional views of still another embodiment of the device for carrying out various stages of the method of the invention.

Reference numeral 1 in FIG. 1 denotes a support plate for a nickel mold 2 of which the surface remote from the support plate 1 comprises a spiral-like information track. Provided centrally on the mold 2 is a quantity 3 of a UV-curable molding resin on the basis of an acrylin acid ester. The support plate 1 is placed on table 5 by means of adjusting pins 4. The positions of the support plate 1 relative to the table 5 can be adjusted by means of the adjusting pins. Table 5 comprises a column 6 which has an arm 7. A linear motor 8 is secured to arm 7 and has a shaft 9 which can be moved in the directions shown by means of the motor 8. Shaft 9 comprises on its side remote from the motor a holder 10 for a flexible substrate 11. Holder 10 comprises a cylindrical collar 12 manufactured from deformable material, for example rubber, which, at its end face remote from the holder 10, has an annular suction cup 13. Collar 12 has a perforation 14 which at one end extends into the suction cup 13 and at the other end passes through the holder 10 connected to the collar 12. Via the perforation a sub-atmospheric pressure can be provided in the suction cup 13 by means of a vacuum pump, not shown, as a result of which the flexible circular substrate plate 11 which is manufactured from a material which passes UV light, for example plexiglass, is drawn against the collar 12 via the suction cup 13. Holder 10 has a second perforation 15 extending into the space 16 which is bounded by holder 10, collar 12 and substrate 11 and which otherwise is airtight. An elevated pressure is realized in space 16 via perforation 15 which can be made to communicate with a pressure pump, not shown.

The method according to the invention performed by means of the device runs off as follows.

As a result of an above atmospheric pressure provided in space 16, the flexible substrate 11 will be vaulted or deformed into a convex, rounded shape with simultaneous elastic deformation of collar 12 with suction cup 13.

The assembly of holder 10 with collar 12, suction cup 13, and convex substrate 11 drawn thereon is moved by the motor 8 in the direction of the support plate 1 with mold 2 and molding resin 3 present below the substrate 11. The central portion of the convex substrate 11 will contact the molding resin 3 first. When the holder 10 with substrate 11 is further lowered, the molding resin will be rolled by the vaulted substrate over the mold 2, the moulding resin spreading over the mold with a circular fluid front and the convex substrate being simultaneously deformed, that is flattened.

FIG. 2 shows the situation in which the molding resin is spread partly over the surface of the mold. The reference numerals used in FIG. 2 correspond to those of FIG. 1.

It is to be noted that upon rolling the molding resin the hydraulic resistance of the layer of molding resin which is inversely proportional to the third power of the thickness of the layer of molding resin correspond to the elastic resistance force of the deformed substrate.

When the substrate 11 has been deformed substantially entirely to form a plane surface and the fluid front has nearly reached the edge of the mold, the substrate 11 is uncoupled from collar 12 with suction cup 13 in that air is admitted to the suction cup 13 via perforation 14 so that the applied sub-atmospheric pressure is removed. Upon uncoupling, the substrate 11, as a result of its natural stress relief, will engage entirely flatly against the surface of the mold and push the fluid front of the resin 3 up to the edge of the mold. Via the substrate 11 which engages the molding resin 3 without stress, the layer of molding resin is cured by exposure to ultraviolet light originating from light source 17 (FIG. 3), for example ultra-violet light of 350 mm originating from a 500 watt water-cooled high pressure mercury lamp. The exposure time depends, for example, on the thickness of the layer of molding resin which may vary from 0.2 to 300 $\mu$m but is preferably 1-75 $\mu$m, on the composition of the molding resin, on the light intensity and on the thickness of the substrate which as a rule is from 1-3 mm. Generally the exposure time will vary from a few seconds to a few minutes.

After curing, in which the substrate 11 is bonded to the molding resin 3, the resulting plastic record carrier is removed from the mold. FIG. 4 shows the plastic record carrier which consists of the cured layer of molding resin 18 having an information pattern and the substrate plate 11 bonded thereto.

Usually, the plastic record carrier is provided on the side of the layer of molding resin comprising the information with a 300 Å thick Al layer (not shown in FIG. 4) which is vapor-deposited in a vacuum bell at a pressure of $10^{-4}$ to $10^{-5}$ Torr. Finally, a protective lacquer layer (not shown in FIG. 4) is provided on the Al layer by pouring nitrocellulose lacquer on the Al layer and centrifuging the assembly, the nitrocellulose lacquer spreading as a thin layer over the Al layer.

Reference numeral 19 in FIG. 5 denotes a support plate for a nickel mold 20 which has a central pin 21. An annular quantity 22 of a UV-curable molding resin is provided on the metal mold 20 around the pin 21. Support plate 19 is secured to table 24 in an adjustable manner by means of adjusting pins 23, the table comprising a column 25 with support arm 26. A linear motor 27 having a movable shaft 28 is secured to support arm 26. At its end remote from the motor 27 the movable shaft 28 is connected to a holder 29 for the flexible substrate 30. Holder 29 has a flexible cylindrical collar 31 which, at its end remote from the holder, has a flared portion 32 in which a vacuum duct 33 is provided. At its end remote from the holder 29, collar 31 is closed by a flexible diaphragm 34 which is mainly circular and has a central recessed portion 35. In this manner, an air-tight space 39 is formed between holder 29, holder 31 and diaphragm 34, in which space an excessive gas pressure can be provided by suitable means, for example a pressure pump, which are not shown in the Figure, via a perforation 36. Holder 29 comprises a second perforation 37 extending through collar 31 into vacuum duct 33. By communicating holder 29 with a vacuum pump not shown, a sub-atmospheric pressure can be produced in duct 33 via perforation 37. As a result of said sub-atmospheric pressure the edge of the flexible substrate 30 is drawn against the widened portion 32 of collar 31. The flexible substrate 30 which has a central aperture 38 the dimension of which corresponds to the inside dimension of the central recessed portion 35 of diaphragm 34, will engage the non-recessed portion of diaphragm 34. The substrate 30 is manufactured from UV-passing plastics, for example polymethylmethacrylate (Plexiglass).

The operation of the device is as follows.

As a result of an over pressure applied in space 39, the diaphragm 34 and the substrate 30 engaging it will be deformed into a convex, rounded shape. The assembly of holder 29, collar 34 and the convex diaphragm 34 with substrate 30 is moved in the direction of the mold 20 with molding resin 22 by means of motor 8. The part of the substrate 30 adjoining the circular aperture will first contact the annular quantity of molding resin 22 which is situated around pin 21 on the mold 20. Substrate 30 with aperture 38 will center around pin 21. The diameter of pin 21 corresponds to the diameter of aperture 38 and also to the inside diameter of recessed portion 35 of diaphragm 34. When the holder 29 with diaphragm 34 and substrate 30 is further lowered, the molding resin 22 will be rolled over mould 20 by means of the vaulted substrate 30 and spread over the surface of mold 20 with a circular fluid front. Deformation, that is flattening of the convex diaphragm 34 and substate 30, will take place while furthermore pin 21 extends via aperture 38 of substrate 30 in recessed portion 35 of diaphragm 34.

FIG. 6 shows the situation in which the molding resin 22 is partly spread over the surface of the mold. The reference numerals used in FIG. 6 correspond to those of FIG. 5.

When the fluid front of molding resin 22 has nearly reached the edge of mold 20 and the diaphragm 34 with substrate 30 has nearly been deformed to a plane surface, air is admitted via perforation 37 so that the subatmospheric pressure in the duct 33 is removed. As a result of this the substrate 30 will be uncoupled from holder 29 and the substrate, as a result of natural stress relief, will be stretched entirely and engage mold 20 in a plane surface. The resin 22 is rolled entirely onto the edge of the mold 20.

The molding resin 22 is cured with UV-light from light sources 40 via substrate 30 (FIG. 7). The exposure is carried out in the same manner as described with reference to FIG. 3. It is to be noted that the support plate, the mold and the substrate preferably have the same outside diameters so that the excess of molding resin after curing can easily be cut away without damaging the layer of resin between mold and substrate.

After curing, the resulting assembly of substrate 30 and the cured layer of molding resin 42 having an information track 41 (FIG. 8) is removed from the mold. This removal may be carried out, for example, by placing the widened end 32 of collar 31 against the assembly, then providing a sub-atmospheric pressure in vacuum duct 33 so that the assembly is drawn against collar 31, and then raising the holder 29 by means of the linear motor 27 so that the assembly connected to holder 29 via collar 31 is pulled from mould 20.

FIG. 8 shows the resulting plastic information carrier in which substrate 30 is bonded to the cured layer of molding resin 42 which has an information pattern 41. The plastic record carrier has a central aperture 43. Reference numeral 44 in FIG. 9 denotes a holder for substrate 45. The holder comprises a circular bottom potion 46 which is connected at its edge to an upright cylindrical jacket 47. At its end remote from bottom portion 46 jacket 47 has an inwardly directed flange 48 which in turn comprises at its free end an upright collar 49. At its end face the collar 49 has an annular vacuum duct 50 in which a sub-atmospheric pressure can be provided via perforation 51 and by means of the vacuum pump not shown. The perforation extends from the vacuum duct 50 axially through collar 49, then radially through flange 48 and jacket 47 and opens into the outer surface of jacket 47.

Substrate 45 is drawn against the end face of collar 49 by using a sub-atmospheric pressure in duct 50. An air-tight space 52 is enclosed by substrate 45, collar 49, flange 48, jacket 47 and bottom 46. A support plate 53 of mold 54 is accommodated in space 52. The support plate 53 has a flange portion 55 which bears on bottom portion 46. The diameter of flange portion 55 corresponds to the inside diameter of jacket 47. The mold 54 which is provided on the support plate 53 and which is parallel to substrate 45, is provided centrally with molding resin 56. A sub-atmospheric pressure can be provided in the said air-tight space 52 via perforation 57 by means of a vacuum pump, not shown.

The method according to the invention carried out by means of this device runs off as follows.

A sub-atmospheric pressure is provided in space 52 via perforation 57. As a result of this, the substrate 45 which is drawn against collar 49 will be deformed into a convex shape, with simultaneous elastic deformation of collar 49. During said deformation the central portion of substrate 45 will contact the molding resin 56 present centrally on mould 54 and the substrate 45, when the sub-atmospheric pressure is increased, will then roll the molding resin over the surface of mold 54 with a circular fluid front. FIG. 10 shows the situation in which the substrate 45 has spread the molding resin 55 over a part of mold 54.

The reference numerals in FIG. 10 correspond to those of FIG. 9.

In the further continuous increase of the sub-atmospheric pressure in space 52, elastic deformation of the flange 48 takes place so that the assembly of substrate 45 with collar 49 and flange 48 is moved in the direction of mold 54. As a result of the increased pressure of the substrate 45 on the mold with moulding resin 56, the molding resin will be further spread over the mold. It will be obvious that during rolling the resin 56, the vaulted substrate 45 will continuously be flattened from the center.

FIG. 11 shows the situation in which no further movement of substrate 45, collar 39 and flange 48 takes place any longer. The substrate 45 has been fully flattened and bears against the molding resin 56 which is spread over the whole mold surface. In this situation the layer of molding resin 56 is exposed to ultra-violet light from light sources 58 and is cured. By gradually removing the sub-atmospheric pressure in space 52, flange 48 and collar 49 will gradually return elastically to the original position in which the substrate 45 with the cured layer of molding resin 56 bonded thereto is released from the mold surface. Finally the sub-atmospheric pressure in duct 50 is removed and the resulting plastic record carrier can be removed from the holder 54. As already stated above, the resulting record carrier may be provided with a reflecting layer and a protective lacquer.

What is claimed is:

1. A method of manufacturing a plastic record carrier having a stratified structure, comprising the steps of placing a relatively thick volume of a fluid molding resin centrally on a minor portion of a surface of a mold having a curved information track, the resin thereby initially covering only said minor portion of the surface of said mold, deforming a flexible substrate into a convex form bulging toward said mold, pressing the substrate against the molding resin with a pressure force, the molding resin thereby being rolled out over the remaining portions of the surface of the mold with a circular fluid front, gradually changing the configuration of said substrate from said convex form to a planar form during the pressing step until the entire information track on the surface of the mold is covered by a relatively thin layer of the resin, and curing the layer of resin, whereby the resin attaches itself to the substrate.

2. A method as claimed in claim 1 wherein the resin is radiation-curable and said curing step includes the step of exposing said resin to ultraviolet radiation through the substrate.

3. The method as claimed in claim 1 wherein said mold is made from metal.

4. The method as claimed in claim 1 wherein said information track on said surface of said mold is a spiral.

5. A method as claimed in claim 1, further comprising the step of releasing the pressure force from the substrate when the fluid front has nearly reached the edge of the mold and while the substrate has not yet been deformed entirely to form a plane surface, whereby the substrate pushes the fluid front towards the edge of the mold and engages the layer of resin without stress.

6. A method as claimed in claim 1, wherein the resin is deposited centrally on the mold in the form of a ring.

7. A method as claimed in claim 6, wherein the substrate has a central aperture, the diameter of the aperture corresponding to or being smaller than the inside diameter of the annular layer of resin deposited on the mold.

8. A method as claimed in claim 1 wherein prior to said deforming step said substrate is a planar disc and is deformed into said convex shape by flexibly supporting the substrate along its entire periphery and then providing a different gas pressure on both sides of the substrate.

9. A method as claimed in claim 8, wherein the difference in gas pressure is variable and also provides the force with which the substrate is pressed against the molding resin.

* * * * *